US005379680A

United States Patent [19]

Bohm et al.

[11] Patent Number: 5,379,680

[45] Date of Patent: Jan. 10, 1995

[54] PISTON FOR AN INTERNAL COMBUSTION ENGINE

[75] Inventors: Gerhard Bohm, Rosstal-Grossweismannsdorf; Klaus Kofahl, Weinstadt, both of Germany

[73] Assignee: Alcan Deutschland GmbH, Germany

[21] Appl. No.: 778,835

[22] PCT Filed: Sep. 25, 1989

[86] PCT No.: PCT/EP90/01600

§ 371 Date: Dec. 20, 1991

§ 102(e) Date: Dec. 20, 1991

[87] PCT Pub. No.: WO91/04429

PCT Pub. Date: Apr. 4, 1991

[30] Foreign Application Priority Data

Sep. 25, 1989 [DE] Germany .............................. 3931949

[51] Int. Cl.[6] .................................................. F16S 1/04

[52] U.S. Cl. ........................................ 92/208; 92/238; 123/193.6

[58] Field of Search .............. 92/208, 238, 240, 169.1; 123/193.6

[56] References Cited

U.S. PATENT DOCUMENTS 4,809,652 3/1989 Essig et al. .................. 123/193.6 X
4,909,132 3/1990 Kling et al. ........................ 92/238 X
4,941,397 7/1990 Kawai et al. ............... 123/193.6 X
5,000,078 3/1991 Gabele ......................... 123/193.6 X
5,048,398 9/1991 Pfeiffenberger ............ 123/193.6 X
5,158,008 10/1992 Ripberger et al. .......... 123/193.6 X

FOREIGN PATENT DOCUMENTS 0181652 5/1986 European Pat. Off. .
0275935 7/1988 European Pat. Off. .
3418454 12/1985 Germany .
60-156956 8/1985 Japan .

*Primary Examiner*—Edward K. Look
*Assistant Examiner*—Hoang Nguyen
*Attorney, Agent, or Firm*—Stevens, Davis, Miller & Mosher

[57] ABSTRACT

A piston for an internal combustion engine comprising a piston head provided with at least one piston ring groove and a piston body having a piston pin bore, and a compression height of less than 40% of the piston diameter. In order to be able to equalize the influences of thermal expansion as well as possible and to enable a quiet operation of the piston in a cylinder, the invention provides that the largest diameter region of the piston body is arranged in a plane which extends perpendicularly to the body-generating line and which includes the piston pin axis.

4 Claims, 1 Drawing Sheet

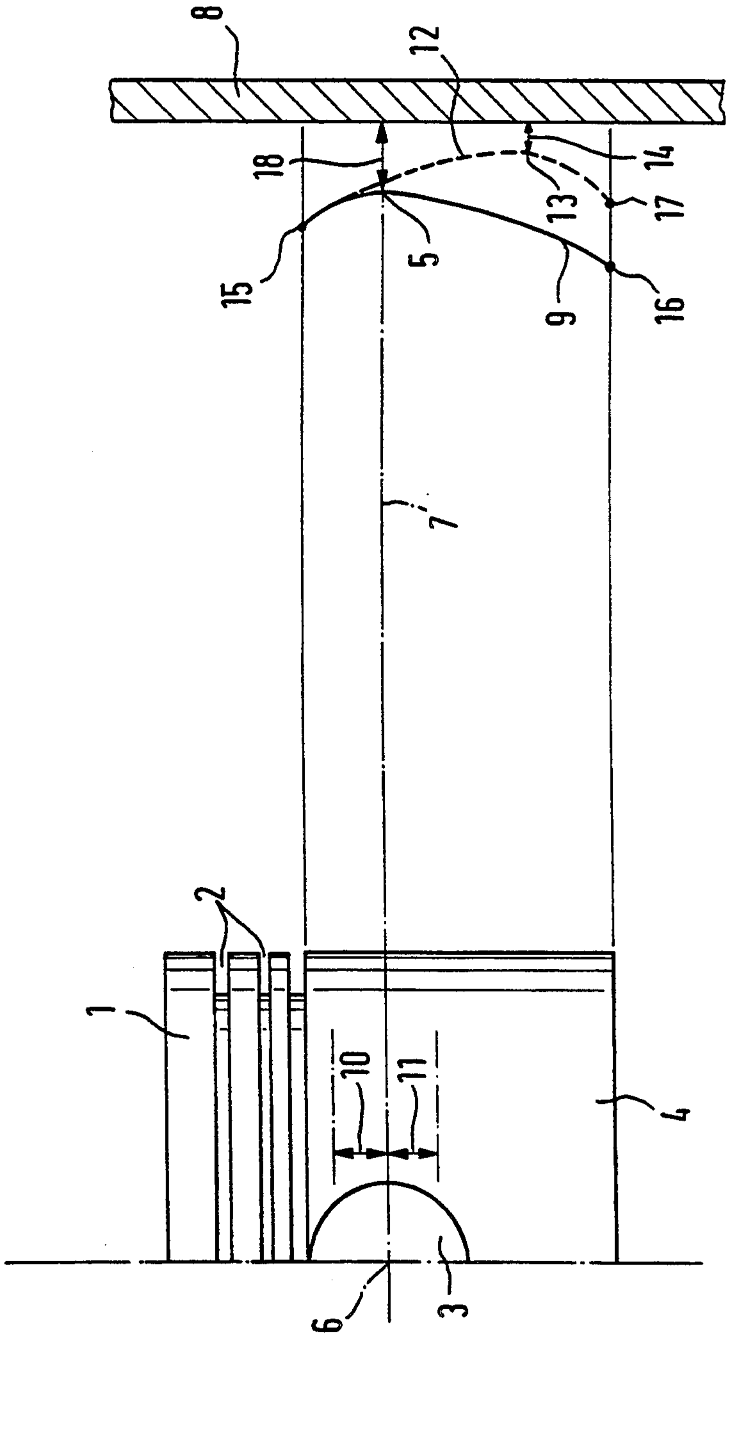
8
12
18
14
13
17
15
5
9
16
7
2
1
10
11
4
6
3

PISTON FOR AN INTERNAL COMBUSTION ENGINE

BACKGROUND OF THE INVENTION

The invention relates to a piston for all internal combustion engine comprising:

- a piston head provided with at least one piston ring groove,
- a piston body having a piston pin bore, the piston body having a largest diameter region, and
- a compression height of less than 40% of the piston diameter.

A piston of a combustion engine is connected with a crankshaft in the known manner via a connecting rod and guided for a reciprocating movement in a cylinder. During this movement of the piston, before a change in direction thereof, the piston reaches a top or bottom dead centre in which the side of the piston which lies against the cylinder wall changes due to the change in the direction of movement of the piston. The tilted movement conducted in this case by the piston takes place about the axis of the piston pin by which the piston is connected with the connecting rod.

Due to the high revolutions of the engine, the described tilting movement of the piston leads to a relatively strong striking of the piston against the respective areas of the cylinder wall, which in turn results in a tilting or chattering noise actually caused by the alternation of the side against which the piston strikes. The greater the play is between the piston and the cylinder wall, the greater the noise. In order to achieve a motion of the piston which generates as little noise as possible, it is therefore important that the play at assembly between the piston and the cylinder wall is made as small as possible; in Otto-cycle engines, for example, the standard play at assembly at the narrowest point, i.e. in the region in which the piston has its largest diameter, is approximately 25 micrometers. However, the selection of the play at assembly and the fitting-in of a piston have proved to be difficult on account of the thermal loads on the piston. As the combustion engine should run quietly in all operating conditions, i.e. for a cold motor as well as in a greatly heated condition, and that in all of these operational conditions, a jamming or seizing of the piston must also be prevented, the expansion of the piston resulting from the heating up thereof must be taken into account. It is therefore usual to provide the piston head, which is subjected to the highest temperature loads, with a somewhat smaller diameter, and to form the part of the piston at which it has its greatest diameter and with which it lies against the cylindrical wall at the piston skirt. On account of the distance of the region of greatest diameter from the top land of the piston, the operational temperatures of the engine have a smaller effect on this greatest diameter region.

The pistons usually applied up to now have a diameter—total length relationship of approximately 1 to 1, i.e. they are formed approximately "quadratically"; pistons of smaller diameter are sometimes provided with a somewhat greater total length. As is known, the length of a piston is divided into the compression height and the lower body length, whereby the compression height is the distance between the centre of the piston pin bore and the edge of the piston head, while the lower body length represents the length from the centre of the piston pin bore to the end of the body.

Usually, the compression height amounts to approximately 60% of the piston diameter.

In the development of ever lighter engines which are also to be operated at ever increasing revolutions, it has been attempted to reduce the moving mass in the engine as much as possible. Here in particular, the weight of the piston plays a decisive role. For the reduction in weight of pistons, apart from the selection of material, the possibility exists to reduce the height of the solid piston head, i.e. to diminish the compression height. This has occured up to values of less than 40% of the piston diameter. In order to ensure a reliable guidance of the piston, the lower piston body length must be simultaneously increased so that the surface pressure stemming from the lateral forces does not exceed certain given values, for example values at which the oil film would be squeezed away from between the piston and the cylinder. By reducing the compression height, the zone of heat influence arising from the heating up of the piston head inevitably moves nearer to the piston pin bore or the eye of the pin so that the largest diameter region must be displaced toward the lower body area as a necessary consequence, if the diameter, i.e. the narrowest play at assembly, is to be maintained unchanged. On account of this displacement of the region of narrowest play to the lower end of the piston body, an increase in the tilting movement of the piston unavoidably results so that the level of noise greatly increases.

In order to remedy this disadvantage, it has been attempted to embed expansion reducing steel regulating inserts in the aluminium material of the piston. Such a piston is described in EP-Bl-171568. These regulating inserts are to serve to influence the expansion of the piston body in order to be able to place the largest diameter region closer to the axis of the piston pin bore in this manner. However, the manufacturing input increases for this kind of development, and in particular the input for casting the piston is increased substantially; further, considerable difficulties can occur in large volume production. On the whole, this solution has not proved to be completely satisfactory.

SUMMARY OF THE INVENTION

It is therefore an object of the invention to provide a piston of the type first described which ensures an operation low in noise, in particular for a compression height smaller than 40% of the piston diameter, and with a simple construction.

The object is solved in accordance with the invention in that the piston body is formed free of regulating strips and that the largest diameter region lies in the region of a plane which extends perpendicularly to the body-generating line and which includes the piston pin axis, it being accepted that the narrowest play at assembly allowable there is larger than the 25 micrometers strived for in the state of the art.

The inventive piston distinguishes itself through a number of advantages.

As the largest diameter region, and thus the smallest play at assembly, is provided in the region of the level of the axis of the piston pin bore, the lever arm arising during the pivoting of the piston at the top or bottom dead centre is extremely small, so that the total movement of the piston in the direction toward or away from the cylinder wall is is minimized. In all, this results in a reduced noise level which leads to quiet operation of the piston.

A further advantage of the inventive piston lies in that the provision of steel regulating inserts can be dispensed with, the piston as a whole thus simpler and therefore cheaper to manufacture.

In a particularly favorable embodiment of the invention, the piston body is formed with with a bulge shape in the region of largest diameter. This can be rounded off in a suitable manner in order to enable a rolling tilting motion of the piston in the region of the top and bottom stroke dead centres. Consequently, a stronger striking of the piston which generates noise is prevented. The apex of the bulge can preferably be arranged in the horizontal plane defined above which encompasses the piston pin axis.

In a further particularly advantageous development of the invention, it is provident that the apex of the bulge lies in a horizontal plane which is arranged at a maximum distance of 0.8% of a cylinder diameter of the cylinder fitting the piston beneath or above the above-mentioned horizontal plane encompassing the piston pin axis. This minimal upwards or downwards displacement of the largest diameter region does not alter the advantageous effect of the inventive piston. The shape of the piston body above the largest diameter region, i.e. the body reduction above this region can be determined for the inventive piston under consideration of the maximum operation temperature and the existing elasticity of the body.

In order to avoid an undesirable pressing of the lower piston body region against the cylinder wall when the piston tilts, it is advantageous if the piston body has a shape of curvature beneath the largest diameter region which is set back from the cylinder wall. In this case, a shape of curvature proves to be particularly favourable, the body reduction of which, in o/oo of the cylinder diameter, at the respective distance from the largest diameter region or from the region of smallest play at assembly, in % of the lower length of the piston, satisfies the following relationship:

| Distance: | Body reduction: |
|---|---|
| 19 | 0.046 |
| 38 | 0.185 |
| 58 | 0.393 |
| 77 | 0.648 |
| 96 | 1.481 |

BRIEF DESCRIPTION OF THE DRAWING

In the following, the invention is described according to an exemplified embodiment in connection with the drawing. The sole drawing figure shows a schematic depiction of an inventive piston (left-hand side of the figure) as well as an enlarged depiction of the wall contour of the inventive piston body in comparison with the wall of a cylinder.

The piston shown schematically in the figure includes a piston head 1 which is provided with at least one ring groove 2. In the depicted exemplified embodiment there are three ring grooves in all. The piston also has a piston body 4 which is provided with a piston pin bore 3. The piston pin axis 6 or the axis of the piston pin bore 3 lies perpendicular to the plane of the figure in the shown example.

DETAILED DESCRIPTION OF THE INVENTION

The right-hand side of the figure schematically shows a cylinder wall 8 which is associated with the shape of curvature 9 of the inventive piston body 4 in an enlarged depiction with regard to the radial measurement relationships.

The shape of curvature 9 is formed in accordance with the invention such that the largest diameter region 5, at which the smallest play at assembly, i.e. the smallest distance to the cylinder surface exists, is arranged perpendicular to the body-generating line, i.e. horizontally, in the region of the plane 7, which extends through the piston pin axis 6. The line of curvature 9 of the wall of the cylinder 8 is set back above this largest diameter region, wherein the setting back can be selected in a suitable manner by the average expert. Beneath the largest diameter region 5, the shape of curvature or the line of curvature 9 also extends with a setback contour, the plot of which preferably satisifies the relationship of the distance to the body reduction indicated above.

In accordance with the invention, it is possible to slightly upwardly or downwardly displace the position of the mentioned horizontal plane, in which the largest diameter region 5 is arranged, parallel to the plane extending horizontally through the piston pin axis 6, wherein the maximum displacement above or below plane 7 (see reference numerals 10 and 11) should be 8% of the cylinder diameter.

The shape of curvature or line of curvature 9 according to the invention is depicted as a solid line in the figure; furthermore, the shape of a line of curvature 12 which is usual in the state of the art is also shown in the figure as a dashed line. It can be clearly seen in the figure that the region of largest diameter 13 is arranged substantially beneath the horizontal plane 7, i.e. at the lower region of the piston body 4, in the case of the known line of curvature 12. Furthermore, the comparison in the figure clearly shows that in the prior art the play at assembly 18 is greater than the play at assembly 14 of a piston known from the state of the art.

Both lines of curvature 9 and 2 respectively have the same upper, final point 5 in the shown exemplified embodiment, while the lower final point 16 of the inventive line of curvature 9 is at a greater distance from the wall of the cylinder 8 than the lower, final point 17 of the previously known lines of curvature.

What is claimed is:

1. A piston for a combustion engine comprising:

a generally cylindrical piston body having a head with at least one piston ring groove, said body having a height with a piston pin bore through said body and an axis of said bore extending perpendicular to said height;

said height being divided into a compression height above the axis of the piston pin bore and a lower body below the axis of the piston pin bore;

said piston body having regions of varying diameter along the height thereof, with a greater diameter, in the shape of a bulge, in a region of the axis of the piston pin bore, said bulge having an apex lying in a plane which is parallel to said piston pin bore axis, said plane lying above or below said piston pin bore axis at a distance which is a maximum 8% of a diameter of a cylinder fitting the piston and said piston body being free of inserts having a coefficient of expansion which is lower than a coefficient of expansion of the piston body.

2. A piston according to claim 1, wherein the bulge has a continuous curvature.

3. A piston according to claim 1, wherein the plane of the apex of the bulge is on the axis of the piston pin bore.

4. A piston for a combustion engine comprising:

a piston head provided with at least one piston ring groove, a piston body having a piston pin bore, said piston body having regions of varying diameter and a largest diameter region, and a compression height above said piston pin bore which is less than 40% of a piston body diameter, wherein the piston body is formed free of inserts having a lower coefficient of expansion than a coefficient of expansion of the piston body, said largest diameter region lying in a region of a plane which extends perpendicularly to a body-generating line and which includes an axis of the piston pin, the piston body having a shape of curvature beneath the largest diameter region which defines a reduction in diameter of the piston body, the reduction, with respect to the cylinder diameter of a cylinder fitting the piston at a respective distance beneath the pin axis plane of the largest diameter region in percentage, with respect to a lower length of the piston below the axis of the piston pin, having the following relationship:

| Distance: in percentage of the lower length | Body reduction: in relation to the cylinder diameter |
|---|---|
| 19 | 0.046 |
| 38 | 0.185 |
| 58 | 0.393 |
| 77 | 0.648 |
| 96 | 1.481. |

* * * * *